Figure 5:
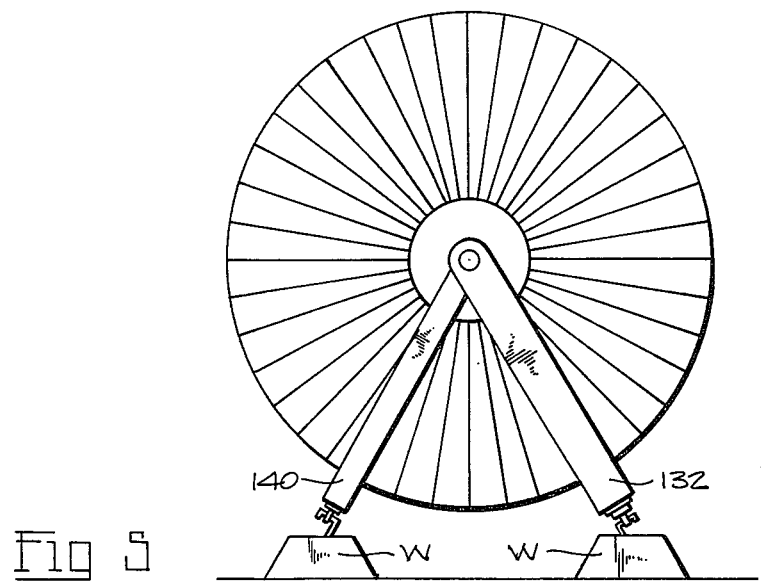

United States Patent [19]

Ferguson

[11] 4,365,772
[45] Dec. 28, 1982

[54] AIRCRAFT HAVING BUOYANT GAS BALLOON

[76] Inventor: Frederick D. Ferguson, Box No. 1151, Station B, Ottawa, Ontario, Canada

[21] Appl. No.: 331,414

[22] Filed: Dec. 16, 1981

Related U.S. Application Data

[62] Division of Ser. No. 64,286, Aug. 6, 1979, abandoned.

[51] Int. Cl.³ .......................... B64B 1/56; B64B 1/66
[52] U.S. Cl. ........................................ 244/33; 244/2; 244/3; 244/118.1; 244/115; 244/153 A
[58] Field of Search ...................... 244/2, 3, 24–33, 244/96, 97, 127, 137 R, 137 P, 118.1, 153 R, 153 A, 10, 21, 39, 93, 34 R, 115, 116; 440/100; 212/71

[56] References Cited

U.S. PATENT DOCUMENTS

| | | | |
|---|---|---|---|
| 1,087,946 | 2/1914 | Hutson | 244/24 |
| 1,426,726 | 8/1922 | Gilbert | 244/127 |
| 1,905,345 | 4/1933 | Dandini | 440/100 |
| 3,017,138 | 1/1962 | Flint | 244/3 |
| 3,369,774 | 2/1968 | Struble, Jr. | 244/31 |
| 3,658,278 | 4/1972 | Batchelor | 244/33 |
| 3,976,265 | 8/1976 | Doolittle | 244/2 |
| 4,195,694 | 4/1980 | Gizzarelli | 244/137 R |
| 4,207,026 | 6/1980 | Kushto | 244/33 |

FOREIGN PATENT DOCUMENTS

| | | | |
|---|---|---|---|
| 2922059 | 12/1979 | Fed. Rep. of Germany | 244/96 |
| 482466 | 3/1917 | France | 244/39 |
| 856153 | 12/1960 | United Kingdom | 244/1 TD |

*Primary Examiner*—Galen L. Barefoot
*Attorney, Agent, or Firm*—Beveridge, DeGrandi & Kline

[57] ABSTRACT

An aircraft is provided utilizing a spherical balloon filled with buoyant gas such as helium at a pressure substantially greater than atmospheric so that its dimensions are substantially unaffected by changes in atmospheric pressure or temperature. The aircraft may take the form of a self-propelled and self-contained airship, or may be merely a passive device for providing lift and intended to be towed by and controlled from a helicopter. The spherical balloon is mounted on a normally horizontal axle having end portions projecting from opposite sides of the balloon, and includes a rigid load supporting yoke including two arms extending upwardly from a central load supporting structure and each with an upper end suspended from the axle.

3 Claims, 18 Drawing Figures

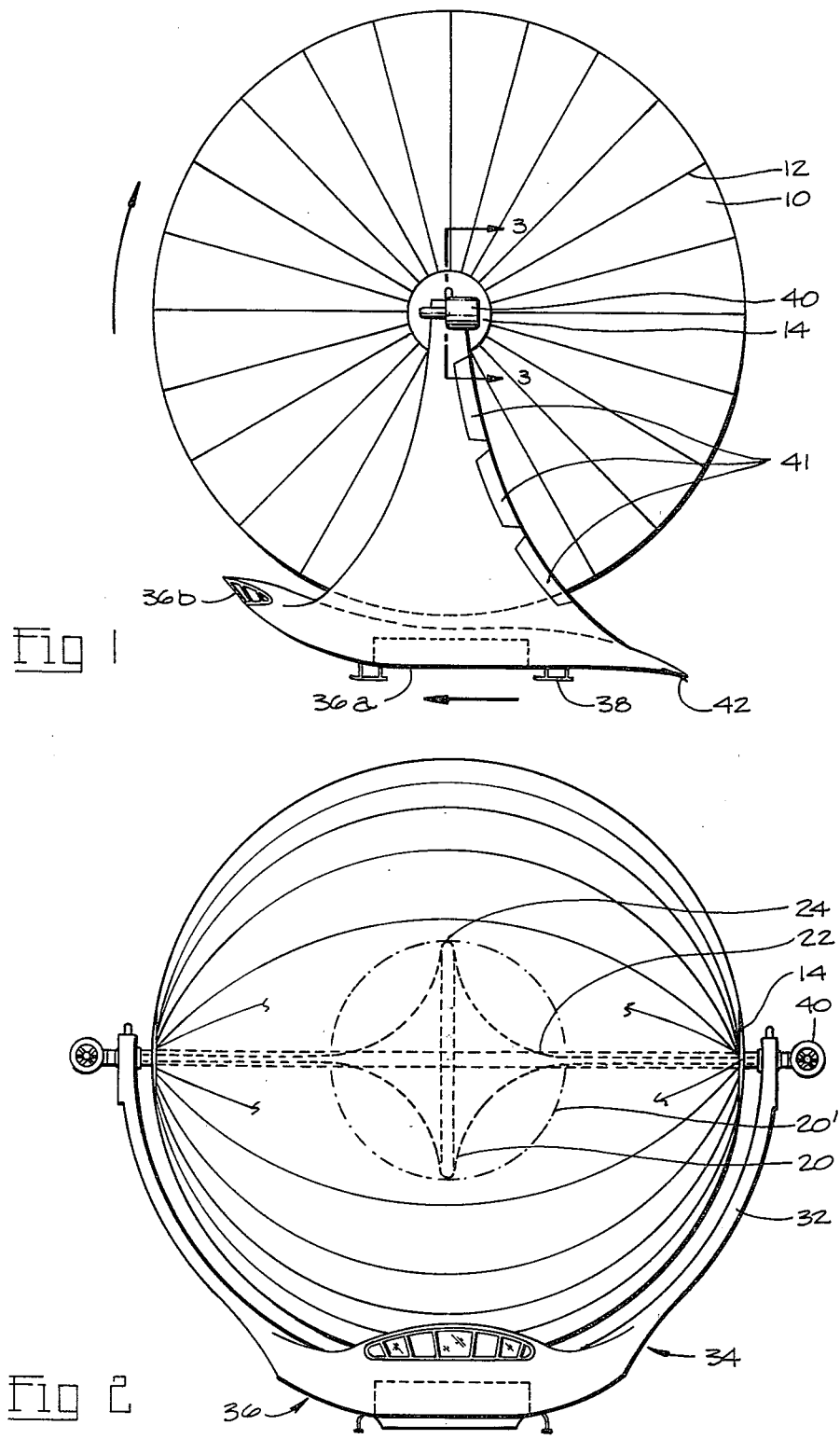

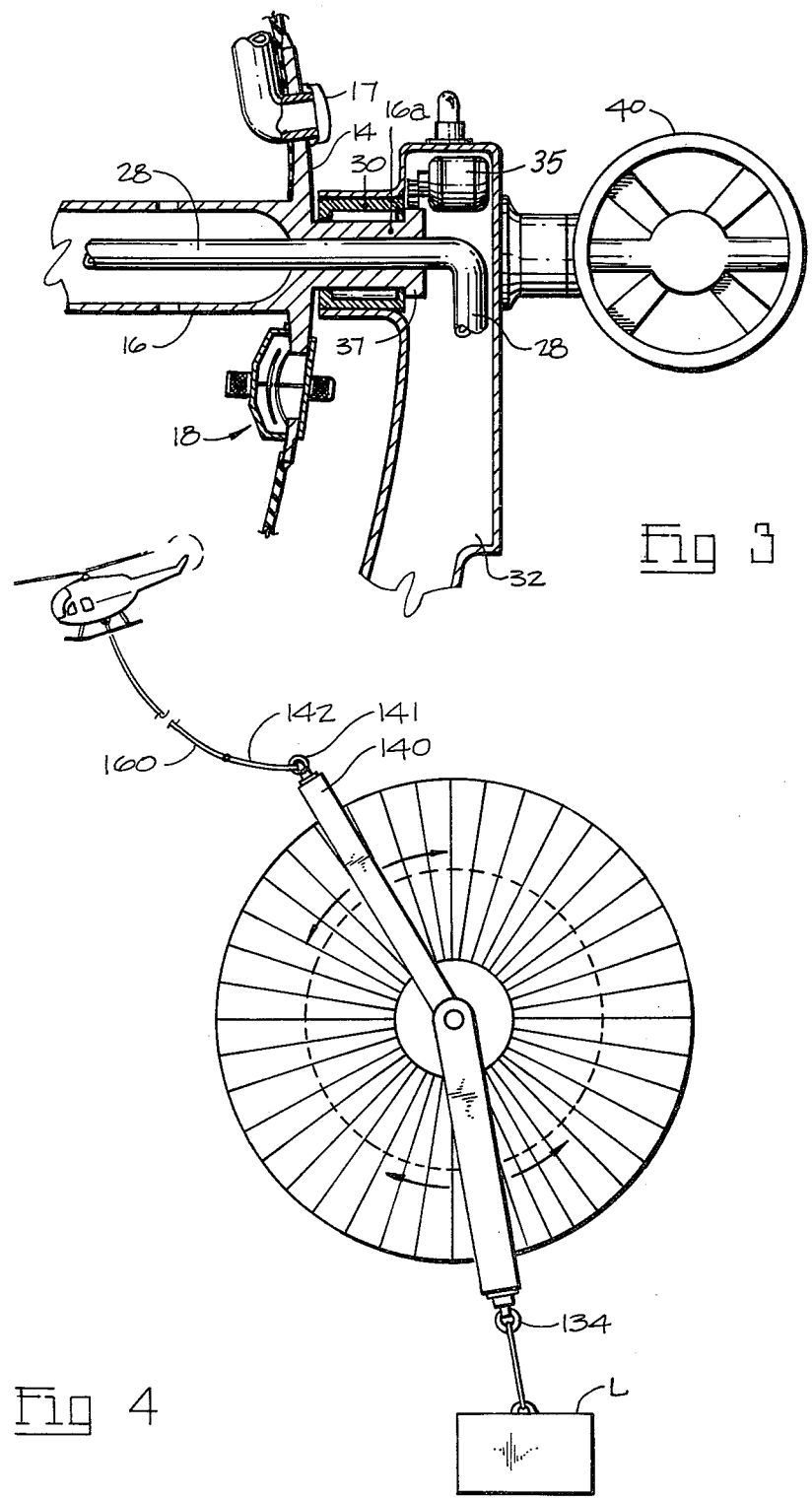

AIRCRAFT HAVING BUOYANT GAS BALLOON

This is a division, of application Ser. No. 064,286 filed Aug. 6, 1979, now abandoned.

The present invention relates to an aircraft in which the major part of the lift is provided by a body of buoyant gas, i.e., a gas lighter than air, for example helium. The aircraft may take the form of a self-propelled and steerable airship (a dirigible), or may be a passive load supporting device intended merely to provide lift with propulsion being supplied by a helicopter or by other means.

Conventionally, airships have been made with the buoyant gas held in gas bags contained within an elongated enclosure, in order to minimize air resistance. An elongated shape of this kind however has some disadvantages especially in large sizes.

Firstly, to achieve good aerodynamic shape in a large airship, a rigid structure is required which contains numerous gas bags and which defines the exterior shape of the airship, and such a structure is quite expensive. Small airships, the so-called blimps, are made without any rigid structure but these cannot be made in an ideal streamlined shape.

A major drawback of conventional airships is the difficulty of mooring and loading a large airship in other than very calm weather, due to the tendency of the craft to act as a weathervane and to swing about with changes in wind direction.

Airships have hitherto used bags of buoyant gas substantially at atmospheric pressure. These bags expand and contract depending on the surrounding atmospheric pressure and temperature, so that the volume of the bags depends both on the weather conditions and on the height of the airship, giving wide fluctuations in the available lift. This means that airship operations are conventionally very much weather dependent, and for example an airship may have to wait until the air temperature has warmed sufficiently before it can take off.

The aircraft of my invention avoids these difficulties by the use of a single, spherical, balloon which contains the buoyant gas (normally helium) at a pressure sufficiently high that the shape and size of the balloon is substantially unaffected by normal changes in atmospheric pressure and temperature, even when the balloon has little or no internal supporting structure.

Balloons containing buoyant gas at pressures substantially higher than atmospheric, so-called "superpressure" balloons, have previously been used as free flight balloons for atmospheric monitoring. The use of a manned balloon of this type as part of a project termed ATMOSAT is described in the APCA Journal, Vol. 27, No. 6 of June 1977. The balloon used was ten meters in diameter and made of a sandwich of materials including an inner layer of Kevlar cloth, a layer of bilaminated Mylar, and an outer sheet of aluminized Mylar. Kevlar is a Trade Mark of DuPont for a polyester fibre; Mylar is a Trade Mark for a polyester made in thin sheets and having great tensile strength.

The superpressure balloons so far made have been free flight balloons having a gondola suspended below the balloon by a series of cables which are attached to tabs spaced around the lower part of the balloon. The balloon fabric is strong enough to hold these suspension means without the usual load bearing net being placed over the top of the balloon. It is reported that the performance of these ATMOSAT balloons displayed extreme stability, the internal pressurization being sufficient to allow them to overcome any atmospheric perturbations which might otherwise have caused the balloon to change altitudes and disturb the measurements.

The aircraft of my invention utilizes a spherical, superpressure balloon of similar nature and fabric to that of the ATMOSAT balloon, but the manner by which the load is suspended from the balloon is quite different from the more conventional arrangement used in the ATMOSAT, and allows a number of important novel features to be incorporated in my aircraft.

The term "superpressure balloon" as used herein means a balloon of non-elastic material, having essentially fixed dimensions and shape which, once the balloon is properly inflated, do not change by reason of the type of changes in external pressure and temperature which occur with normal atmospheric changes and changes in altitude. A superpressure balloon is normally designed to accommodate safely an internal pressure of say 35 millibars above atmospheric pressure, so that the balloon can be launched with a pressure slightly above atmospheric pressure and fly at at least several thousand feet without loosing the buoyant gas (helium). Depending on size, however, a superpressure balloon may accommodate pressures of over 100 millibars above the surrounding pressure, and special materials may be used to increase this pressure to say 300 millibars or more. The fabric used for these superpressure balloons may have strength between 175 lb/in and 700 lb/in, depending on internal pressure to be used and depending on diameter. The aircraft of this invention will preferably use a balloon strong enough that it can be filled with helium at ground level and can hold all the helium while operating at up to 15,000 ft. which will be the maximum altitude for unloaded flight. Although provision is made for dumping helium in the event of excess internal/external pressure differential, it is not envisaged that dumping will normally occur. However, there will be some normal reduction of helium pressure with increasing altitude due to release of air from a ballonet which is contained within the balloon, as described below.

In accordance with one aspect of my invention, in an aircraft comprising a superpressure balloon for containing a buoyant gas and having load supporting means which are suspended from the balloon during flight, the load supporting means comprises rigid arms extending upwardly from load engaging means to connection means on opposite sides of the balloon centre, these connection means being aligned with a normally horizontal axis through the balloon centre.

The connection means preferably allow rotation of the balloon about the said normally horizontal axis; in this way any twisting forces in the balloon adjacent the connecting means are minimized.

The connection means also preferably include an axle passing through the centre of the balloon; this is not only convenient where rotation is to be allowed, but additionally adds structural strength to the aircraft, and holds the correct spacing of the load supporting arms.

The aforesaid normally horizontal axis is transverse to the normal direction of travel of the aircraft; for example as determined by the means for propelling the aircraft where propelling means are provided as in a dirigible airship.

The load supporting means is preferably in the form of a rigid yoke having the two arms extending upwardly from a central load engaging means. Such a yoke provides a rigid connection between the load engaging means or gondola and the balloon. With this arrangement, turning or propelling forces applied to the load supporting yoke are suitably transmitted to the balloon without any flexible cables intervening and conversely when the aircraft is moored the balloon is held rigidly to the load engaging means. However, in the case of a dirigible airship in accordance with my invention, it is preferred that the propulsion means are located close to the upper ends of the yoke arms so that the forces are most directly transmitted to the connection means and thus to the balloon.

Preferably, the arms of the load supporting yoke are curved to conform with the balloon curvature and to support the load engaging means in such position that the gap separating the outer surface of the balloon from the adjacent surface of the structure is less than one third the balloon radius.

The arms of the load supporting means may constitute two halves of a semi-circular or similarly curved load supporting yoke.

In accordance with a further feature of my invention, the connection means are provided with bearing means which allow rotation of the balloon about the said normally horizontal axis, and means are provided for rotating the balloon about this axis. It is theorized that rotation of the balloon reduces the drag of forward movement through the air. Also, in accordance with known aerodynamic principles, if the balloon is rotated in such direction that the surface of the balloon facing its forward direction of movement moves upwards relative to the centre of the balloon, then the rotation supplies additional lift to the aircraft. This allows for operation at a greater height and thus reduces drag otherwise prevailing. The lift effect can be increased by the use of ribs around the balloon.

Another important aspect of my invention accordingly is an aircraft comprising a spherical superpressure balloon for containing a buoyant gas, a rigid load supporting yoke including two arms extending upwardly from a central load engaging means and each with an upper end, means rotatably connecting the upper ends of said arms to the balloon in such manner as to allow the balloon to rotate about a normally horizontal axis passing through the centre of the balloon, means for propelling the aircraft through the air in a forward direction, and means for rotating the balloon about said horizontal axis in such direction that the surface of the balloon facing said forward direction moves upwards relative to the centre of the balloon.

The means for rotating the balloon are preferably mounted within one or both of the arms of the load supporting yoke.

It has previously been proposed in accordance with Canadian Pat. No. 153,756 which issued to Hutson to provide an airship with a rotating structure or "wheel" containing independently inflatable compartments or gas bags. The purpose of rotation was primarily to prevent over-heating of the gas contained in the gas bags, although it is stated "This large rotating wheel also forces the air downwardly during the forward movement of the machine and occasions a lifting impulse". Actually, rotation as described would not produce a lifting impulse but rather the opposite. Also, it is believed that a large rotating wheel containing separate gas bags as suggested by this patent is not a practical proposition since the gas bags, being constantly subjected to lifting forces, will tend to move or expand towards the top of the wheel as this is rotated upsetting the balance of the wheel, causing oscillations, and making this difficult to rotate. Further, it is to be noted that in this prior patent the means for rotation are not contained in the yoke arms but include a cable which encircles the periphery of the wheel.

As indicated above, the aircraft of this invention can be a passive load supporting device, most suitably designed for towing by a helicopter. By means of such device, the load which can be moved by a helicopter can be increased five times or more. For this purpose, the aircraft having the superpressure spherical balloon, and rigid load supporting yoke leading to connection means on a normally horizontal axis, as described above, is provided with a towing yoke having two arms, with their outer ends pivotally mounted adjacent the connecting means and pivotable on said axis, and having a central attachment means for a tow bar or cable, and the arrangement is such that the towing yoke is pivotable from a towing position in which its arms extend upwardly from the axle towards the towing helicopter, to a tethering position where its arms extend downwardly from the axle and allow the fixing means to be used to tether the aircraft to the ground.

The buoyancy of the balloon of my aircraft (and hence the lifting forces) can best be regulated by an air containing ballonet within the balloon, connected to a compressor capable of forcing air into the ballonet against the pressure of buoyant gas to expand the ballonet and thereby to reduce the volume of buoyant gas. The ballonet may provide the sole means for regulating the altitude of the aircraft.

Figure 6:
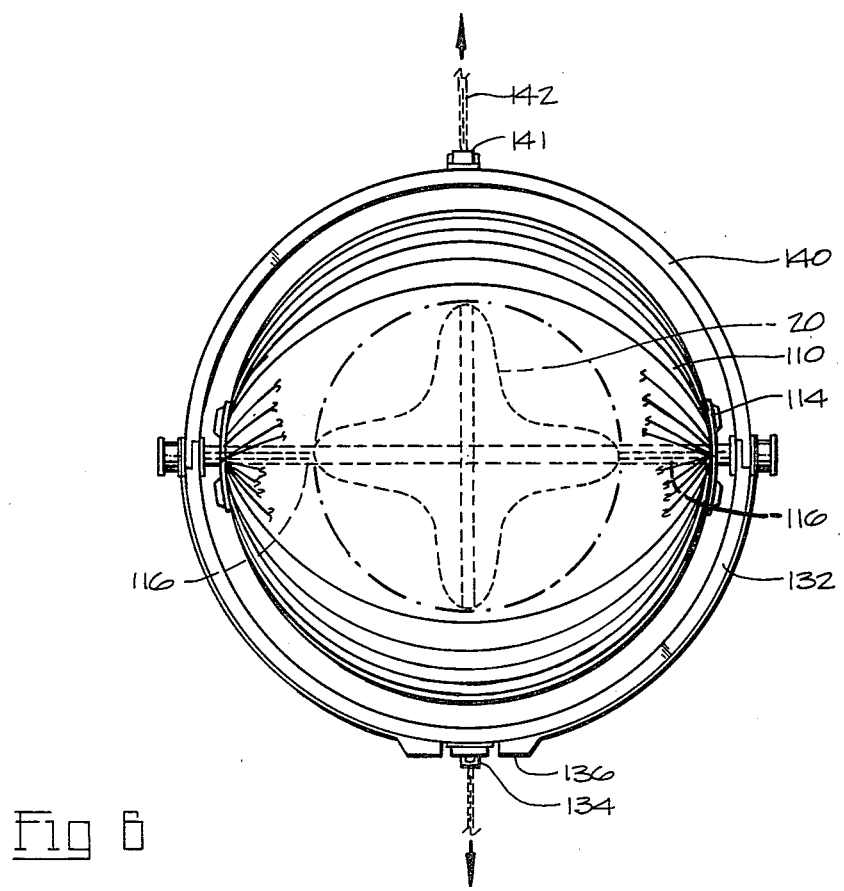
Figure 7A:
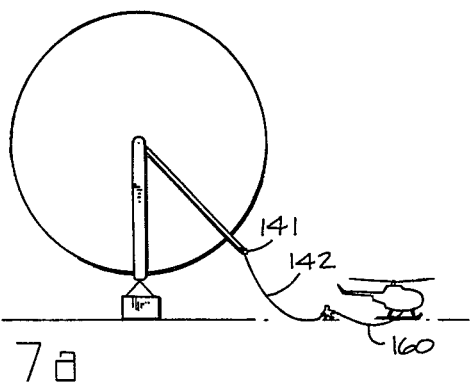
Figure 7D:
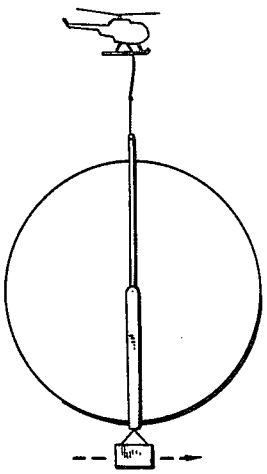
Figure 7B:
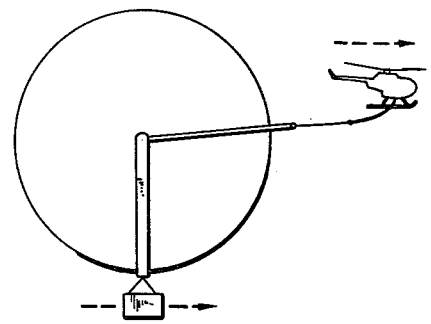
Figure 7E:
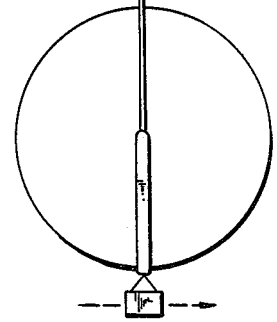
Figure 7C:
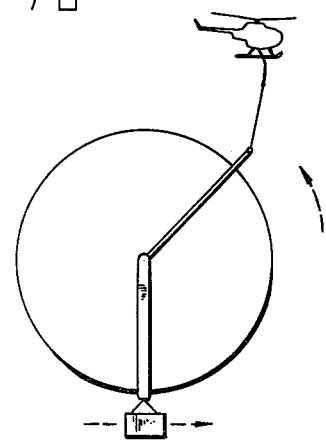
Figure 7F:
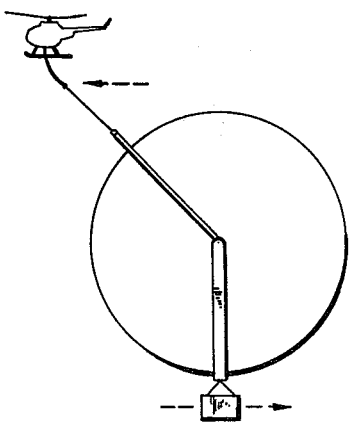
Figure 7G:
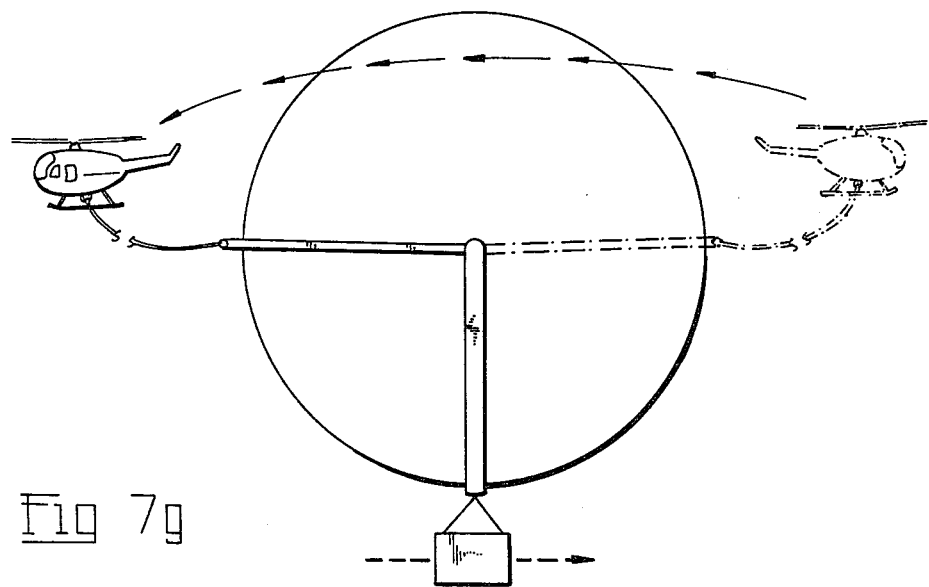
Figure 8:
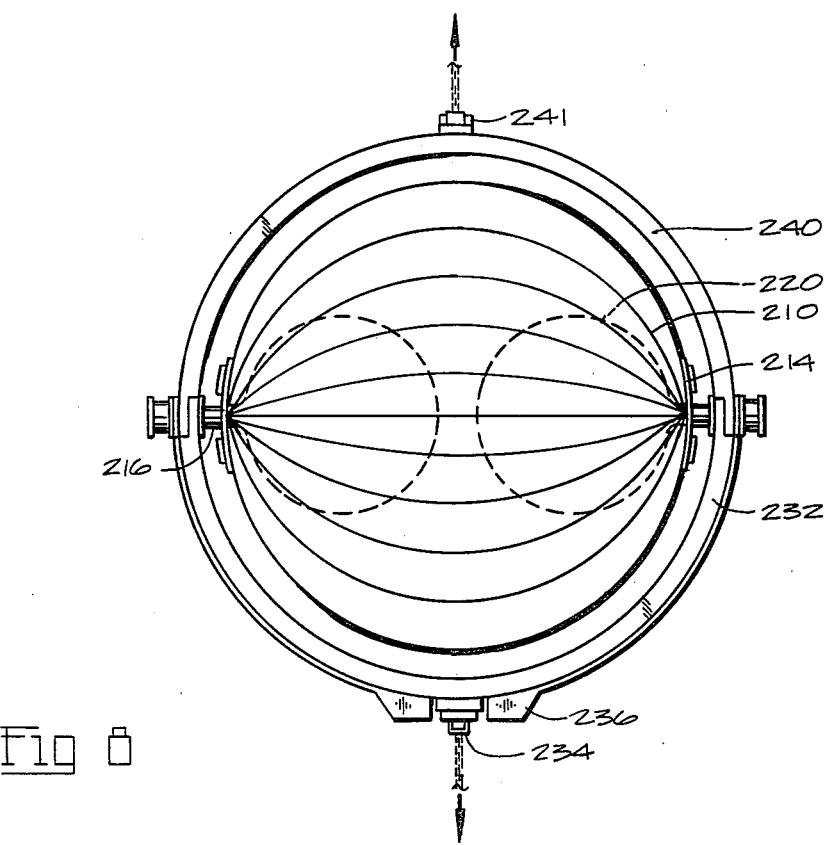
Figure 9:
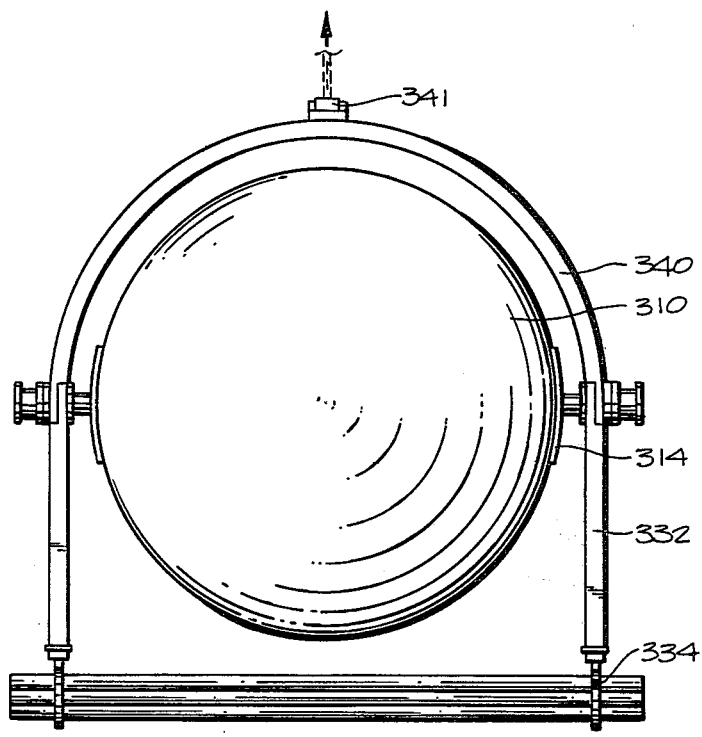
Figure 10A:
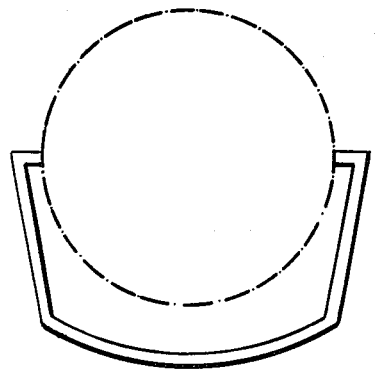
Figure 10B:
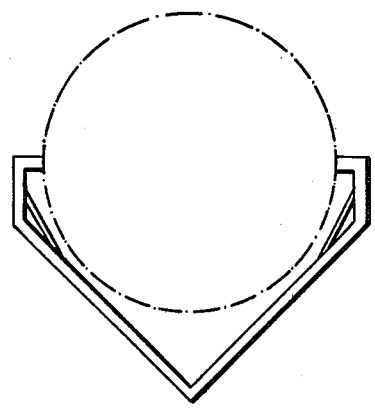
Figure 10C:
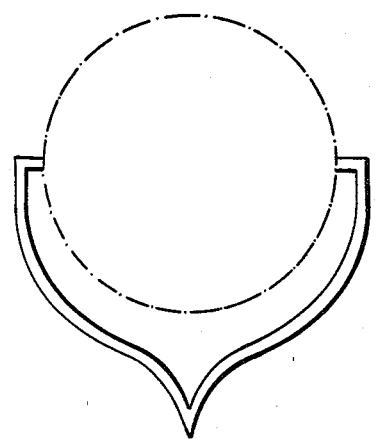

Further features of the invention will be described with reference to the accompanying drawings showing preferred embodiments of the invention, and in which:

FIG. 1 shows a side elevation of a dirigible airship in accordance with my invention, FIG. 2 shows a front view of the airship, FIG. 3 shows a diagrammatic detail view generally on lines 3—3 of FIG. 1, FIG. 4 shows a side elevation of a passive load support aircraft in accordance with my invention, FIG. 5 shows the aircraft of FIG. 4 when moored to the ground, FIG. 6 is a diagrammatic front elevation of the aircraft of FIG. 4, FIGS. 7a to 7g are diagrammatic views showing operations of the aircraft shown in FIG. 4, FIG. 8 is a front view of a modified passive load support aircraft in accordance with my invention, FIG. 9 shows a front view of a further modified passive load support aircraft, and FIGS. 10a to 10c show diagrammatically different forms of load supporting means.

The airship shown in FIGS. 1 to 3 has buoyancy provided by a non-rigid, spherical balloon or envelope 10 filled with helium at a pressure maintained at all times above about 1035 millibars. The balloon or envelope material will be a sandwich formed of Kevlar-29 fibre woven as a standard bias weave, with a single heavy bias being incorporated every three inches, and with on the inside an adhered layer of bilaminated Mylar and on the outside an adhered sheet of aluminized Mylar. At each side of the balloon this material is bonded firmly to the edge portions of a circular, dished steel plate 14, the plate 14 having a central aperture which is welded around a hollow central axle 16 (see FIG. 3). The material of the balloon is fairly smooth in texture and incorporates small ribs 12 extending around the surface of the balloon in generally circumferential directions extending from plate 14 on one side to that on the other so that the balloon as a whole has a non-smooth surface. The material of the balloon also preferably includes stiffening battens similar to sail battens particularly near the outer circumference remote from the axle, to maintain the spherical shape of the balloon. The plate 14 is provided with a helium fill port 17 (normally closed) and a helium pressure regulating device 18 in the form of a motor driven valve which automatically vents helium to the atmosphere if the internal pressure of the balloon exceeds atmospheric pressure by 40 millibars or more.

The axle 16 supports a central ballonet 20 shown in outline in FIG. 2. This is an expandable enclosure having its two end portions tapered down and sealed to the axle at 22 and having its central portion maintained in expanded condition by a circular hoop 24 held spaced from the axle 14. The central portion of the axle within the ballonet has a cavity with ports connecting to the interior of the ballonet and also being in sealed communication with non-rotating supply tubes 28 the end of one of which is shown in FIG. 3. A dual blower air compressor (not shown) is provided at each end of the axle for supplying air through tube 28 to the ballonet to expand this against the pressure of the helium in balloon 10 to vary the buoyancy of the balloon. When fully expanded the ballonet is approximately circular in shape as indicated at 20' in FIG. 2.

The balloon does not include any substantial internal structure, as with a rigid airship, although there may be cables connecting the axle to points on the envelope to maintain the proper spherical shape of the balloon. The use of numerous separate gas bags, as used in the Hutson patent, is avoided, although there may be one or more dividers extending radially of the axle for separating the internal space into separate compartments. The distribution of lifting gas throughout the balloon is substantially uniform.

End portions 16a of the axle are rotatable in bearings 30 which are provided at the top ends of arms 32 of a load supporting yoke indicated generally at 34. These arms each contain an electric motor 36 which drives a gear train terminating in gear wheel 37 attached to the end of axle 16, these motors being arranged to rotate the axle and balloon in the direction shown in FIG. 1. A slipping clutch or like element may be included in the drive train to prevent undue rotational stress being applied to the balloon. As may be seen in FIG. 1 from the arrow at the bottom of the figure, the direction of travel of the airship is such that the forward face of the balloon is constantly rising. The rotation will be at a controlled but variable speed of a few r.p.m. The rotation and the ribbed surface of the balloon prevent laminar air flow, and provide turbulent flow that is accelerated (low pressure) on the upper side and retarded (higher pressure) on the lower surface, thus providing lift; it is believed that this rotation will also reduce the drag of the balloon as it moves through the air. Rotational speed will be selected to give optimum values of lift and drag reduction.

The upper ends of arms 32 also carry variable pitch propeller, gas turbine engines 40 mounted on pods which can pivot about a horizontal axis coincident with that of axle 16, the engines being pivotable through 200° from a vertically upward to a vertically downward, slightly rearward direction. The variable pitch propellers also allow reversal of thrust so that the engines can serve to drive the aircraft in forward or rearward motion, lift or lower the aircraft, and in addition can tilt the aircraft about a central fore and aft axis or can rotate the aircraft about a vertical axis.

The central part of the load carrying yoke 34 is a gondola 36 which includes load engaging means in the form of cargo area 36a. Arms 32 are curved to conform to the shape of the balloon and to position the gondola 36 quite close to the bottom of the balloon, so that the distance separating the bottom of the balloon from the top of the gondola is preferably less than 1/10th of the balloon radius and in any event less than ⅛ of the balloon radius. This improves the manouverability of the craft as compared to a standard balloon construction where the gondola is supported by relatively long cables from the balloon and ensures that the balloon can be held reasonably firmly merely by mooring cables connected to the gondola. At the forward upper end of the gondola there is provided a cabin 36b for the crew members from where the craft is controlled. The cabin is pressurized to allow operation at high altitudes where drag on the aircraft is reduced. The base of the gondola has skids 38 provided for landing on solid ground, although pontoons may be used for water.

The arms 32 are elongated in the fore and aft direction and are streamlined, and are provided with rudders 41. The main body of the gondola is generally of aerofoil form having a relatively high width to height ratio (say at least 6 to 1) along most of its length, the aerofoil shape providing additional lift during forward movement. As shown in the drawings, the forward end of the gondola is raised and the top of the gondola body from the front end to the longitudinal center has a curve conforming to the bottom of the balloon to provide a passage therebetween. The tail section of the gondola has ailerons 42. The rudders 41 and ailerons 42 provide useful control in case of engine failure.

The above described airship is designed to have a balloon of 160 foot diameter, giving a gross weight of 29 tons and a payload for freight of 20 tons. The speed of travel will be about 80 miles per hour.

FIGS. 4 to 7 show a smaller version of my aircraft intended for use as a lifting device for use in association particularly with a helicopter.

This embodiment comprises a ribbed, superpressure balloon 110 having end plates 114 and a central horizontal axle 116, and a central ballonet 120, all of these items being generally similar to corresponding items of the first embodiment except that the size of the balloon will be smaller, i.e., about 72 feet in diameter.

The load supporting yoke 132 of this embodiment is a simple semi-circular member having at its centre a strong load engaging hitch 134, flanked on each side by pods 136 containing an air compressor for the ballonet and a source of helium for the balloon, and having feet on which the craft may rest. The upper ends of yoke 132 are pivotally connected to projecting end portions of the axle 116. Also pivotally connected to the end portions of the axles is a towing and tethering yoke 140 which is similar to but of lighter construction than that of yoke 132, and which also has a central attachment means for cable 142 preferably in the form of winch 141. The yokes 132 and 140 are pivotable relative to each other so that they can form either a relatively small angle of less than 90° or a large angle of approaching 180°. The main load carrying yoke 132 may also carry means for rotating the balloon 110 similar to those described with reference to the first embodiment.

The cable 142 has a hitch connection designed to receive the lower end of a tow bar 160 shown in FIG. 4, the upper end of this tow bar being connected to a helicopter as shown. Tow bar 160 is a flexible, resilient member preferably in the form of a long curved tube which provides a semi-rigid connection between the helicopter and the towing yoke 140 but with enough resiliency to accommodate shock loadings. A radio control system may be operated from the helicopter to control the functioning of the ballonet compressor and the balloon rotating motors if used, and also to monitor the pressure of helium within the balloon; the aircraft itself being unmanned in this version.

The manner in which this aircraft will be used is evident from a study of FIGS. 4 to 7. FIG. 5 shows the static moored condition in which the aircraft is held secured to the ground by two heavy weights W secured respectively to the two yokes 132 and 140. A load L is attached to the hitching point 134 of the yoke 132 and this is released from the associated mooring weight. Yoke 140 is released from the second mooring weight and connected to the helicopter tow bar by cable 142 when extended from winch 141 for the purpose as illustrated in FIG. 7a. The cable 142 is then drawn in by the winch, and the ballonet is partly vented to atmosphere until the aircraft has sufficient lift to raise the load; the aircraft and load are then towed as shown in FIGS. 4 and 7b.

FIGS. 7d to 7g show subsequent manoeuvres. The vertical position of FIG. 7d allows free rotation to reverse; rotation being illustrated in FIG. 7e. FIG. 7f shows reverse tow position allowing braking and precise manoeuvering. FIG. 7g shows an alternative reversing procedure; the helicopter moves from its original horizontal heading, pulling the aircraft around to a reverse or turning position. The aircraft turns, but the load is attached by a swivel mount and does not turn.

On landing, the yoke 140 is again released from the helicopter and used to moor the aircraft to the ground before the load L is released.

This craft may be made readily transportable by deflation of the balloon and dismantling of the arms.

An even simpler version of my aircraft may be made similar to the latter embodiment but without any towing yoke, and with the load being moved by a tow bar connected at one end to the load supporting yoke and at the other end to a land or water vehicle. In this case the air compressor and/or ballonet (and thereby the buoyancy) may be controlled by radio or cable from the towing vehicle.

FIG. 8 shows a modification of the lifting device of FIGS. 4 to 7 in which the axle is omitted. The device of FIG. 8 includes a superpressure balloon 210 secured to end plates 214 on opposite ends of a central axis passing through the centre of the balloon. These end plates have outwardly extending spigots which are aligned with the aforesaid horizontal axis and which are maintained in this alignment by bearings provided at the outer end of the arms of the load supporting yoke 232 and at the outer end of the arms of the towing yoke 240, so that the balloon can rotate about the horizontal axis. The load supporting yoke includes a load engaging hitch 234 flanked by pods 236, and the towing yoke 240 has a central hitch member 241, all these items being similar to those of the previous embodiment. In the present case, however, instead of a central ballonet being used, two ballonets 220 are provided each connected to one of the side plates 214 and each supplied with air through the arms of yoke 232. Means are provided for ensuring that the pressure between the ballonets is normally balanced, although there may also be means for inflating one ballonet more than the other when necessary to trim the aircraft.

FIG. 9 shows a further embodiment of the aircraft of FIGS. 4 to 8, and having balloon 310 fixed to side plates 314 and having connecting means (which may be part of a central axle as in FIGS. 4 to 7 or may be spigots as in FIG. 8) rotatably connecting the towing yoke 340 to the balloon. In this embodiment, however, the load supporting means takes the form of two separate arms extending downwards from a pivotal connection with yoke 340 (similar to that of FIGS. 4 to 7 or FIG. 8) to load engaging means 334. The latter means may be, for example, a grapple or sling as shown suitable for holding elongated objects such as pipes (for oil or gas pipe lines) or large timbers.

FIGS. 10a to 10c show, diagrammatically, various forms of load supporting yoke which may be used instead of the semicircular yokes of FIGS. 4 to 8.

I claim:

1. An aircraft comprising:
   a spherical non-elastic balloon for containing a buoyant gas and having essentially fixed dimensions and shape when inflated,
   a rigid load supporting yoke including two arms each with an upper end suspended from said balloon at opposite sides to the centre of the balloon, said suspension means allowing rotation of the balloon relative to the load supporting yoke,
   a rigid towing yoke having two arms and having a central attachment means for a tow bar or cable,
   means pivotably connecting outer ends of the towing yoke arms to the upper ends of the load supporting yoke in such manner that the towing yoke can be pivoted relative to the load supporting yoke about a horizontal axis passing through the centre of the balloon from a towing position in which the towing yoke extends upwardly from its connection with the load supporting yoke, to a tethered position wherein the towing yoke extends downwardly from said connection with the load supporting yoke and allows said attachment means to be used to tether the balloon to the ground, said towing yoke being dimensioned relative to the balloon so as to be pivotable through at least 180° relative to the load supporting yoke.

2. An aircraft according to claim 1, wherein said load supporting yoke arms are curved to conform with the balloon curvature and to support the load engaging means in such position that the gap separating the outer surface of the balloon from the adjacent surface of said load engaging means is less than $\frac{1}{3}$ of the balloon radius.

3. An aircraft according to claim 1 or 2, wherein said balloon encloses an air-containing ballonet, and wherein compressor means are provided to supply atmospheric air to said ballonet at pressure higher than that of the buoyant gas, to control the buoyancy of the aircraft.

* * * * *